United States Patent [19]

Augusti et al.

[11] Patent Number: 4,833,533
[45] Date of Patent: May 23, 1989

[54] COLOR IMAGE REACTING APPARATUS HAVING A NON-UNIFORMITY CORRECTION ROM WITH SECTIONS CORRESPONDING TO RED, GREEN, AND BLUE COLOR SEPARATION FILTERS

[75] Inventors: Ferdinando Augusti, Turin; Luigi Bonatto, Ivrea; Anna M. Puglisi, Naples, all of Italy

[73] Assignee: Ing. C. Olivetti & C., S.p.A., Turin, Italy

[21] Appl. No.: 858,929

[22] Filed: May 2, 1986

[30] Foreign Application Priority Data

May 3, 1985 [IT] Italy .................. 67407 A/85

[51] Int. Cl.[4] .................. G03F 3/08; H04N 1/46; H04N 5/228; H04N 9/73
[52] U.S. Cl. .................. 358/80; 358/29; 358/75; 358/163
[58] Field of Search .................. 358/163, 75, 80

[56] References Cited

U.S. PATENT DOCUMENTS

| | | | |
|---|---|---|---|
| 3,800,078 | 3/1974 | Cochran et al. | 358/163 |
| 4,520,395 | 5/1985 | Abe | 358/163 |
| 4,554,583 | 11/1985 | Saitoh et al. | 358/163 |
| 4,647,961 | 3/1987 | Kammoto et al. | 358/163 |
| 4,679,073 | 7/1987 | Hayashi | 358/29 C |
| 4,727,434 | 2/1988 | Kawamura | 358/75 |
| 4,731,661 | 3/1988 | Nagano | 358/29 C |

FOREIGN PATENT DOCUMENTS

| | | | |
|---|---|---|---|
| 52-52523 | 4/1977 | Japan | 358/29 C |
| 55-79567 | 6/1980 | Japan | 358/163 |
| 55-112685 | 8/1980 | Japan | 358/163 |
| 56-58370 | 5/1981 | Japan | 358/75 |
| 60-96955 | 5/1985 | Japan | 358/80 |

OTHER PUBLICATIONS

Patent Abstracts of Japan, vol. 5, No. 113 (E-66) [785], Jul. 22, 1981, For Kokai 56-50668, Sasaki et al.
William H. Bruce, Jr., et al. "Calibration Mechanism for a CVT Image Input Module", Xerox Disclosure Journal, vol. 8, No. 3, May/Jun. 1983, pp. 273-274.
Mitsuo Togashi et al., "Facsimile Shading Corrector", 1984 IEEE International Solid-State Circuits Conference Digest of Technical Papers, pp. 204-205.
Patent Abstracts of Japan, vol. 9, No. 4 (E-288) [1727], Jan. 10, 1985, For Kokai 59-153377, Nagashima.

Primary Examiner—James J. Groody
Assistant Examiner—Randall S. Svihla
Attorney, Agent, or Firm—Banner, Birch, McKie & Beckett

[57] ABSTRACT

The charge coupled device (23) provides serialized signals from a line of a document (11) to an A/D converter (28). In order to compensate for factors such as non-uniformity of lighting, non-uniformity of CCD cell response and variations with time, a reference strip (29) is read before each reading of a document and the corresponding digital values are stored in a RAM (31). Thereafter the stored values and the values read from each line of the document are compared to provide compensated values to a half tone generator (42) which codes the output. In particular, the comparison is effected by means of an EPROM (32) addressed in part by the digital value derived from a pixel in the line of the document and in part by the digital value stored in the RAM (31) from the corresponding pixel in the reference strip. The values held in the EPROM (32) correspond to the ratios between the addressing values. The EPROM (32) includes a plurality of sections, one for each of a plurality of different colors selected by a multiplexer (41) in correspondence with the selection of a filter (24) determining the scanning color. The reference strip is scanned through each filter before the document is scanned to determine the values in the RAM (31).

3 Claims, 2 Drawing Sheets

COLOR IMAGE REACTING APPARATUS HAVING A NON-UNIFORMITY CORRECTION ROM WITH SECTIONS CORRESPONDING TO RED, GREEN, AND BLUE COLOR SEPARATION FILTERS

BACKGROUND OF THE INVENTION

The present invention refers to a digital reading device for facsimile apparatus comprising a light source for illuminating the document to be read, means for directing the image of a line of the document thus illuminated on to a series of reading elements for generating a series of response signals in response to the points read along the line, an A/D converter operative on the response signals to provide digital signals, and means for coding the intensity of the digital signals according to a half tone scale.

In known apparatus of the aforesaid type, a given pixel of an image generates a signal whose intensity depends on the position along the image line of the original image point in the document, because of the different effect along the line of the means for directing the image on to the reading elements, the state of the illumination lamps, the variation in the time of response of the individual reading elements and the different response by one reading element to the other.

SUMMARY OF THE INVENTION

The object of the invention is to provide a reading device in which the amplitude of the reading signal is compensated, eliminating the effect of the variations in response of the said elements to a pixel of determined intensity due to decay of response through time and variation with position. The object problem is met by the device according to the invention, which comprises means for storing the signals obtained from the A/D converter in a preliminary reading of a calibrated background and read-only memory means jointly addressed to the signals obtained from the A/D converter in the reading of the document and the signals thus stored, for supplying output signals representing pixels compensated for the variation of the transfer function of the individual sensing elements and said directing means, said apparatus further comprising a number of filters selectable for being interposed between said image and said series of reading elements, control means operable for selecting said filters in sequence so as to cause said series of reading elements to generate in sequence a series of digital signals associated with each one of said filters in said preliminary reading and for storing same in said storing means, said read-only memory means comprising a number of sections corresponding to said number of filters, each section being jointly addressed for each image pixel by the digital signals obtained in a reading of a strip of said image through the associated filter and the corresponding digital signals stored in say storing means, each section of said read-only memory means supplying output signals representing pixels differently compensated according to the associated filters.

BRIEF DESCRIPTION OF THE DRAWINGS

The invention will be described in more detail, by way of example, with reference to the accompanying drawings, in which.

DESCRIPTION OF THE PREFERRED EMBODIMENT

Figure 1:
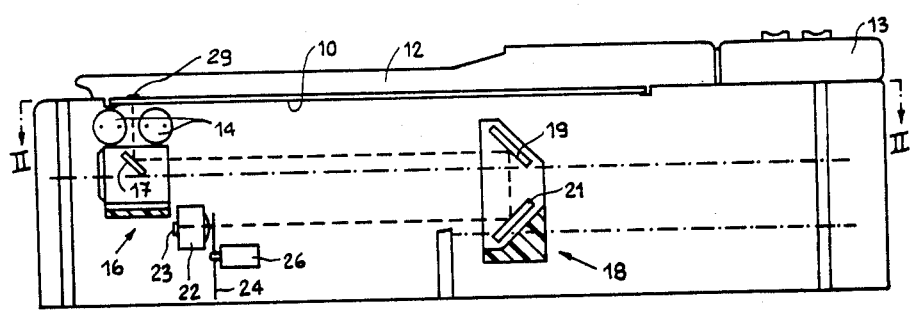
FIG. 1 is a section of a schematic representation of a facsimile apparatus, incorporating a digital reading device embodying the invention.

With reference to FIG. 1, a transparent support plate 10 for a document 11 (FIG. 2) to be read is fixed and is covered with a hinged cover 12 (FIG. 1), suitable for holding the document 11 against the plate 10. Adjacent to the cover 12 is placed a keyboard 13 for control of the digital reader. This includes two fluorescent lamps 14, carried by a first carriage 16 moving transversely to explore the whole length of the document. The lamps 14 are selected in such a way as to supply collectively a substantially constant distribution of spectral energy versus wavelength in the field of vision. As an example two lamps of the company Toshiba have been selected, one lamp 14 being of blue colour and the other of white colour with cold light, designated EDCW by Toshiba. The carriage 16 carries a mirror 17 inclined at 45°, so as to reflect the image of the elementary line of the document in plane parallel to the document itself, as indicated by the broken line in FIG. 1. The reader comprises also a second carriage 18 carrying a pair of mirrors 19 and 21 inclined 45° in opposite directions, so as to reflect the optical beam 180° towards an objective 22. This focuses the beam onto a series of reading elements constituted by cells of a choice-coupled device 23 (CCD).

In order to allow the reading of images in colour, the optical beam can be filtered by a colour filter selected from a number of filters carried by a disc 24. This can be rotated by a stepping electric motor 26 in order to select from one time to the next the required filter. In particular the disc 24 comprises position without a filter for reading in black and white and three positions with red, green and blue filters for the reading of the respective colours. The cells of the CCD 23 are so spaced that each element can receive the light reflected by a small area of the document, called a pixel. The number of pixels per mm, generally between 3 and 12, determines the horizontal resolution of the reading device. The number of lines per mm read on the document on the other hand determines the vertical resolution of the reader. As an example the device may comprises a CCD 23 with 2048 cells, by means of which a 210 mm line is read with a resolution of 10 points/mm. As is known, the cells of the CCD 23 generate electrical signals corresponding to the intensity of light received, which after being serialized and then filtered and amplified by a circuit 27 (FIG. 3) are sent to an analogue-digital converter 28 having for example a resolution of 6 bits, through which 64 levels of amplitude of reading signal can be identified. In particular the converter 28 is of the fast type, known as a flash A/D converter.

The digital signals can be coded, transmitted, stored and/or reproduced on paper. The ideal conditions for a correct reading would require a light source 14 (FIG. 1) which is homogeneous along the line, an objective 22 devoid of losses at the edges, a constant reflectance of the mirrors 17, 19 and 21 and a perfect homogeneity of response of the different cells of the CCD 23.

In reality the effect of the CCD 23 on a document of A4 format, with an objective 22 of 50 mm and an f/2.8 aperture, reduces by half the response signal at the edges of the line compared with the response which the same pixel would give at the centre of the line. With an aperture of f/5.6 the reduction of the edges is about 30%, and in combination with the reduction due to dirty lamps about 50%. The non-homogeneity of the cells of the CCD 23 can lead to a variation of the signal of ±10%, while dust deposition on the mirrors 17, 19 and 21 and the aging of the lamps 14 cause variations in time, (although these variations are homogeneous along the length of the line).

According to the preferred embodiment of the invention on the plate 10 (FIG. 2), in a position adjacent to the upper edge of the document 11, there is fixed a sample strip 29 of white colour, which constitutes the calibrated background of the original and is suitable for being read by the CCD 23 as a sample line before every reading of the document 11. The reading device comprises a read/write memory (RAM) 31 (FIG. 3), to store the signals obtained in a preliminary reading of the sample strip 29, and means for comparison comprising a programmable read-only memory (EPROM) 32 to compare the reading signals of the individual elementary lines of the document 11 with the signals stored in the RAM 31. Therefore the RAM 31 has a capacity of at least 12 K bits. The reading device comprises a central processing unit (CPU) 33 of a microprocessor type, which when it receives a command for reading the document 11, generated by the keyboard 13, executes a program recorded in a read only memory (ROM) 34.

The CPU 33 controls a circuit 36 for controlling the CCD 23, via a logic signal EXP corresponding to the duration of the enablement of the CCD for reading the document. In particular the circuit 36, in response to the logic signal EXP, generates an analogue signal $\phi X$, which determines the duration of the enablement of the CCD 23, and a timing signal $\phi T$, which determines the serialisation of the signals generated by the CCD 23, to be sent to the circuit 27.

Figure 2:
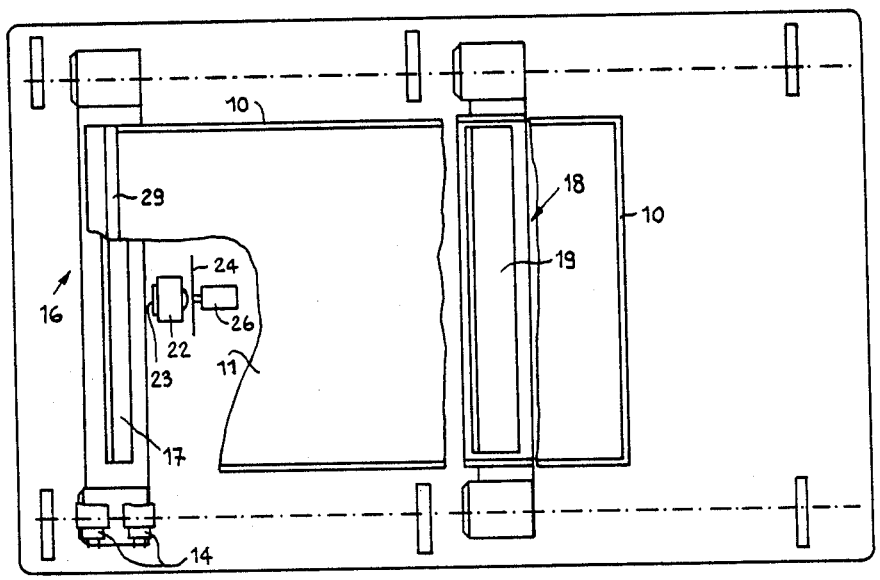
FIG. 2 is a plan of the apparatus along the line II—II of FIG. 1.

The circuit 36 also generates a logic signal LN at every elementary line read and a logic signal CK at every pixel signal sent by the CCD 23 to the circuit 27. These two signals are sent to a counter 37, whose capacity is equal to the number of cells of the CCD 23 and hence to the number of pixels of an elementary line. The counter 37 thus indicates the position of the pixel whose signal is sent to the circuit 27. The output of the counter 37 addresses the successive locations of the RAM 31 in which the signals provided by the converter 28 are to be written or from which the signals stored there are to be read. The CPU 33 also generates, at the beginning of the reading routine given by the ROM 34, a signal C for a compensation command, which controls a circuit 38 for enablement of writing in the RAM 31. This circuit is further controlled by the signals LN and CK so as to emit the write-enable signal WR during the reading of the sample strip 29 (FIG. 2). Thus the signals of this reading, emitted by the converter 28 (FIG. 3), are recorded in the RAM 31 at the addresses given by the counter 37. On the other hand during the reading of the successive lines of the document 11, the signals emitted by the converter 28 are no longer stored by the RAM 31 and the counter 37 only addresses the cells of RAM 31 for reading from one line to the next.

The CPU further provides two signals C1 and C2 indicative of the colour of the filter, according to the following table:

| C1 | 0 | 1 | 0 | 1 |
|---|---|---|---|---|
| C2 | 0 | 0 | 1 | 1 |
| COLOUR | B/W | RED | GREEN | BLUE |

The signals C1 and C2 control a circuit 39 for selection of the filter; this circuit 39 controls the rotation of the stepping motor 26 (FIG. 1) in a manner known per se.

The EPROM 32 (FIG. 3) is constituted by four sections associated with the four colours defined before. The four sections are addressed in parallel with 12 bits, six of which are supplied by the converter 28 in the direct reading of each pixel of the lines of the document 11, while the other six are supplied by the reading of the RAM 31 at the adddress given by the counter 37, whereby these represent the signals given by the converter 28 in the reading of the corresponding pixel of the sample line.

In each section of the EPROM 32, at each address there is recorded in advance a 4-bit value proportional to the ratio between the direct reading signal of a pixel and that recorded in the RAM 31 in the preliminary reading of the corresponding pixel of the sample strip 29. In particular the value recorded in the EPROM 32 is obtained by multiplying a number equal to the level number, desired for representing a predetermined amplitude of the reading signal, by the ratio between the value of the direct reading expressed by the six address bits supplied by the converter 28 and the value of the preliminary reading expressed by the six address bits supplied by the RAM 31. By recording this 4-bit value in the EPROM 32, it is possible to obtain directly the values of 16 levels of amplitude of the signal of the pixel read in the line of the document, basically compared with the signal of the pixel read in the sample line.

In other words on each section of the EPROM 32 there is constructed a true and proper table of compensated values of reflectance compared with an address formed by six pre-stored bits in the RAM 31 and by six bits relating to the immediate reading of the pixels of the document. These values represent therefore the signals of the pixels compensated in amplitude for all the deteriorations of these occurring with time and with transverse location, through non-homogeneity of the lighting of the original, through dust deposition on the mirrors, through loss at the edges of the objective and through the non-homogeneity of the cells of the CCD.

The four sections of the EPROM 32 permit the adoption of different compensations for the three primary colours and for black. The values thus addressed on the four sections of the EPROM 32 are sent to a multiplexer 41, which under the control of the two signals C1 and C2 sends to a half-tone generator circuit 42 for coding greys of half-tones only those relating to the colour selected by these signals.

The circuit 42 is also organised in four sections, one for each colour, selectable by the same signals C1 and C2. For each value given by the four bits of the multiplexer 41, the circuit 42 selects a corresponding sequence of bits indicative of the white and coloured points, to represent the corresponding value of the half-tone, in a manner in itself known.

The signals generated by the circuit 42 are then converted from serial to parallel by a serial-to-parallel converter 43 and are stored in a line buffer 44, under the control of an enablement signal DS emitted by the CPU 33 only when the scanning of the document 11 is effected. From the buffer 44 the stored signals are then taken for compression and subsequent storage in a mass or transmission memory to a distant station, or for controlling a device for reproduction of the image read.

It must be noted that during the reading of the sample line the EPROM 32 also supplies the four bits recorded at the address represented by two equal groups of six bits. Since, however, the CPU 33 does not emit the signal DS, these values are not stored in the buffer 44.

Figure 3:
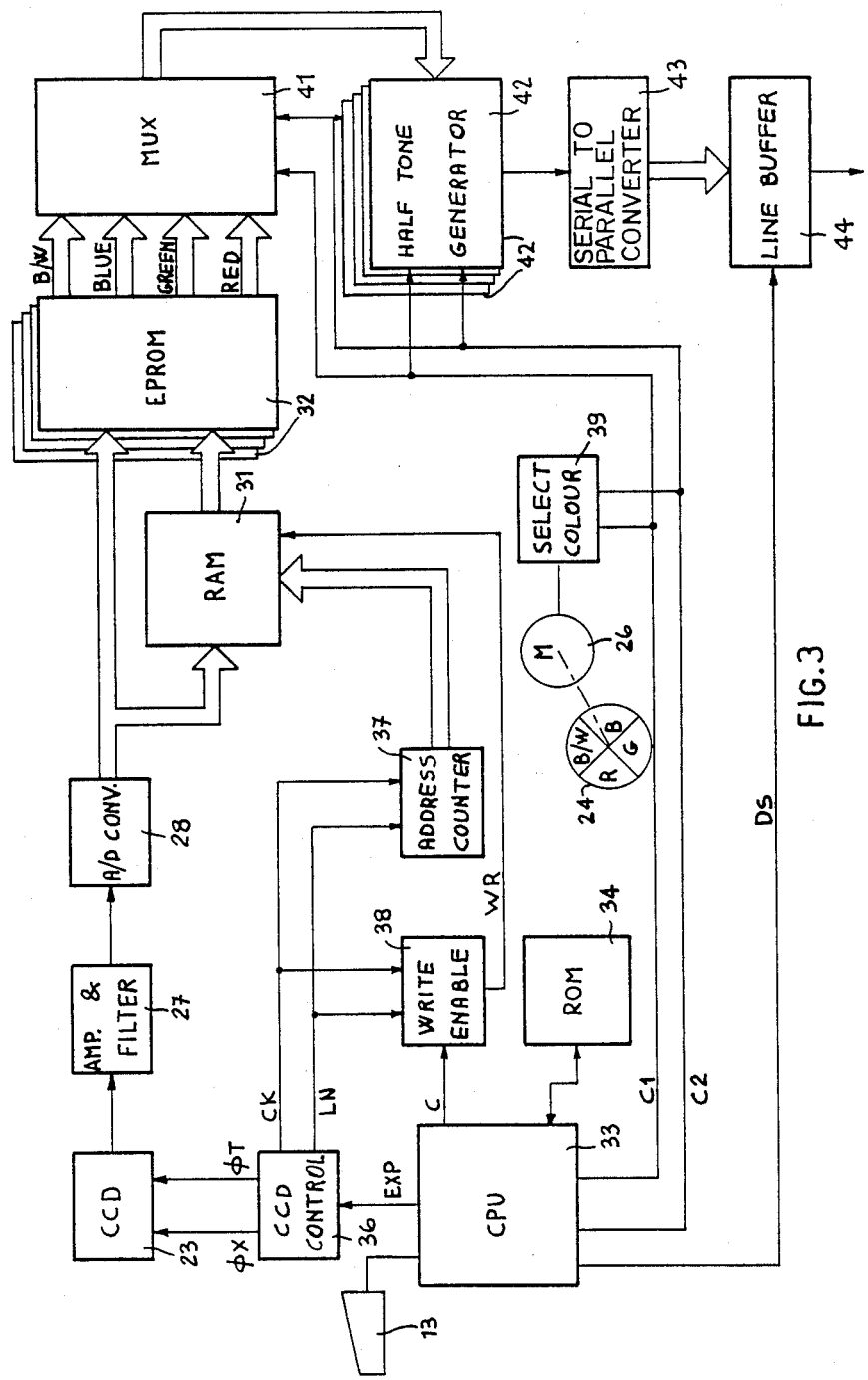
FIG. 3 is a block diagram of the circuit for generating the signals of the reading device.

The program recorded in the ROM 34 comprises a routine for reading in black and white and a routine for reading in colour. The two routines are selected by means of the keyboard 13. The routine for reading in black and white makes the device execute a single reading cycle, in which the corresponding white position of the filter 24 is selected. At the beginning the sample line 29 (FIG. 2) is read and the values of the pixels so read are stored in the RAM 31 (FIG. 3). Immediately afterwards the lines of the document 11 are read one after the other and the values of the pixels so read are are compensated by the B/W module in the EPROM 32.

The routine for reading in colour on the other hand makes the device execute three successive cycles of reading of the document 11, making the CPU 33 generate successively the values of the signals C1 and C2 which indicate red, green and blue. For each colour the device, by means of the circuit 39, first selects the corresponding filter of the disc 24 (FIG. 2). Then it reads with this filter the sample line 29, storing the signals in the RAM 31 (FIG. 3). Finally it reads with the same filter the successive lines of the document 11 and, by means of the associate section of the EPROM 32, it supplies the reading signals of the corresponding colour, compensated in amplitude.

It is understood that the device described can have various modifications and improvements made to it within the scope of the claims. For example the EPROM 32 can be replaced by a ROM or by any circuit suitable for supplying in output numerical values, as a function of both the signals obtained in the reading of the sample line and those obtained in the direct reading of the lines of the document. Furthermore, the value recorded corresponding to each address of the compensation memory (EPROM or ROM) can be multiplied by a factor K which takes account of the particular use of the signal, for example for a video or for a print-out according to a specific technology. In that case, whenever the utilisation of the signals of the device is changed, it is necessary to replace the compensation memory. In particular the device can be fitted with a number of compensation memories, automatically selectable as a function of the use of the signal chosen from time to time.

We claim:

1. A color image reading apparatus, comprising a light source for illuminating a document bearing an image to be read, light directing means including at least one mirror and an optical objective, said light directing means being effective for directing light reflected by a strip of said image thus illuminated onto a series of cells of a charge-coupled device (CCD) for reading the strip by generating a series of response signals in response to a series of image pixels along the strip, an A/D converter operative on said series of response signals to provide corresponding series of digital signals, storing means for temporarily storing a series of digital signals obtained from said converter during a preliminary reading of a calibrated background sample strip, a read-only memory means having a plurality of memory cells corresponding to the series of cells of the CCD, the memory cells of said read-only memory means being sequentially addressed by both the series of digital signals obtained from said converter during the reading of the strip of said image and the series of digital signals stored in said storing means for supplying from each memory cell a digital output signal for a corresponding one of the image pixels along the strip of the image, the digital output signal being compensated for compound variations in the illuminating action of said light source and transfer functions of said at least one mirror, said objective and said CCD, said apparatus also comprising a number of filters selectable for being interposed between said image and said CCD, control means operable for selecting said filters in sequence so as to cause said CCD to generate in sequence a series of response signals associated with each one of said filters during said preliminary reading and for storing a corresponding series of digital signals obtained from said converter in said storing means, said read-only memory means comprising a number of sections corresponding to said number of filters, each section of the read-only memory means having a plurality of memory cells corresponding to the series of cells of the CCD, the cells of each section of the read-only memory means being sequentially addressed by both a series of digital signals obtained from said converter during a corresponding reading of the strip of said image through the associated filter and the corresponding series of digital signals stored in said storing means, the memory cells of the various sections of said read-only memory means so addressed supplying digital output signals representing corresponding ones of the image pixels along the strip of the image, the digital output signals being differently compensated according to the corresponding ones of the filters, and including half-tone coding means having a number of sections corresponding to the sections of said read-only memory means, each section of said coding means receiving the digital output signals supplied by the corresponding section of said read-only memory means for coding the digital output signals as patterns of black and white pixels indicative of the levels of the digital output signals.

2. An apparatus according to claim 1, characterized in that each digital output signal is indicative of a value which is proportional to the ratio of the value of the corresponding digital signal obtained from said converter during the corresponding reading of the corresponding strip of the image to the value of the corresponding digital signals stored in the corresponding section of said storing means.

3. Apparatus according to claim 1, including manual means operable for disabling the sequential selection of said filters and the associated repeated readings of said sample strip and said strip of said image, and for enabling direct readings of said sample strip and said strip of said image, said read-only memory means including an additional section having a plurality of memory cells which are sequentially addressed by both a series of digital signals obtained from said converter during the direct reading of said strip of said image and a series of digital signals stored in said storing means during the direct reading of said sample strip for supplying compensated digital output signals representative of a black-and-white image, said half-tone coding means including a corresponding additional section for coding the compensated digital output signals supplied by said additional section of said read-only memory means.

* * * * *